United States Patent
Yaras et al.

(10) Patent No.: US 7,832,979 B2
(45) Date of Patent: Nov. 16, 2010

(54) VORTEX HYDRAULIC TURBINE

(76) Inventors: Metin Ilbay Yaras, 26 Link Road, Chelsea, QC (CA) J9B 1E3; Mohammad Golriz, 50 Malhotra Court, Ottawa, ON (CA) K1V 1K2

( * ) Notice: Subject to any disclaimer, the term of this patent is extended or adjusted under 35 U.S.C. 154(b) by 881 days.

(21) Appl. No.: 11/736,766

(22) Filed: Apr. 18, 2007

(65) Prior Publication Data
US 2007/0248451 A1 Oct. 25, 2007

(30) Foreign Application Priority Data
Apr. 19, 2006 (CA) .................... 2544108

(51) Int. Cl.
*F03D 1/02* (2006.01)
(52) U.S. Cl. .................. 415/4.3; 415/4.5; 415/906; 415/908; 417/194
(58) Field of Classification Search ............ 290/44, 290/54; 415/2.1, 3.1, 4.1, 4.3, 4.5, 7, 905, 415/906, 908; 416/6, 9, 10, 11, 12, 85; 417/194, 417/197
See application file for complete search history.

(56) References Cited

U.S. PATENT DOCUMENTS

| 4,026,587 | A |   | 5/1977  | Hultman |            |
|-----------|---|---|---------|---------|------------|
| 4,053,787 | A |   | 10/1977 | Diggs   |            |
| 4,070,131 | A | * | 1/1978  | Yen     | ... 415/4.4 |
| 4,274,009 | A |   | 6/1981  | Parker, Sr. |       |
| 4,383,797 | A |   | 5/1983  | Lee     |            |
| 4,421,990 | A |   | 12/1983 | Heuss   |            |
| 4,452,562 | A | * | 6/1984  | Hsu     | ... 415/208.1 |
| 4,629,904 | A |   | 12/1986 | Rojo, Jr. |         |
| 4,816,697 | A |   | 3/1989  | Nalbandyan et al. | |
| 4,850,190 | A | * | 7/1989  | Pitts   | ... 60/398  |
| 4,864,152 | A |   | 9/1989  | Pedersen |           |
| 4,935,639 | A |   | 6/1990  | Yeh     |            |
| 6,559,553 | B2 |  | 5/2003  | Yumita et al. |      |
| 6,956,300 | B2 |  | 10/2005 | Gizara  |            |
| 6,957,947 | B2 |  | 10/2005 | Williams |           |
| 7,442,002 | B2 | * | 10/2008 | Mondl   | ... 415/7   |
| 7,541,688 | B2 | * | 6/2009  | Mackie  | ... 290/54  |

FOREIGN PATENT DOCUMENTS

| CA | 636725  | 2/1962 |
| CA | 2160756 | 4/1996 |

(Continued)

*Primary Examiner*—Edward Look
*Assistant Examiner*—Ryan H Ellis
(74) *Attorney, Agent, or Firm*—Volpe and Koenig, P.C.

(57) ABSTRACT

An apparatus for generating electric power from water currents comprises a housing having at least one pair of channel, at least one pair of turbine assemblies and at least one pair of generator assemblies. Each channel of the pair has an axial intake, an axial discharge opening and a side intake. Each side intake extends along a length of the channel and faces in an upstream direction to receive a side inflow of water and directs the side inflow up against an interior surface of the channel to create a vortical flow structure having a low pressure core. The vortical flow structures are produced downstream of the turbine assemblies to effect an increase in a pressure drop across each of the turbine assemblies. The apparatus also has partition extending between the channels near said axial intakes.

28 Claims, 3 Drawing Sheets

FOREIGN PATENT DOCUMENTS

| | | |
|---|---|---|
| CA | 2217826 | 8/1998 |
| CA | 2348927 | 4/2000 |
| CA | 2388513 | 4/2001 |
| CA | 2460479 | 3/2002 |
| CA | 2462847 | 4/2003 |
| CA | 2366043 | 6/2003 |
| CA | 2409502 | 4/2004 |
| DE | 4122667 | 1/1993 |
| DE | 10134509 | 5/2002 |
| EP | 0097635 | 1/1984 |
| FR | 1086320 | 2/1955 |
| FR | 2862117 | 5/2005 |
| RU | 1813186 | 4/1993 |
| WO | 92/13191 | 8/1992 |
| WO | 2004/097216 | 11/2004 |
| WO | 2005/024226 | 3/2005 |

\* cited by examiner

VORTEX HYDRAULIC TURBINE

FIELD OF THE INVENTION

The present invention relates to vortex hydraulic turbines.

BACKGROUND OF THE INVENTION

Vortex wind turbines (also referred to as cyclone or tornado turbines) use side inlets to generate a vortical flow structure downstream of the turbine blades. The low pressure core of the vortical flow structure draws ambient air from below the vortex to assist in driving the turbine blades.

U.S. Pat. No. 4,070,131 (Yen) and U.S. Pat. No. 4,935,639 (Yeh) both disclose wind power plants having vertical plates disposed about the periphery of a tower to provide side inlets for creation of a vortical flow structure. These plates give rise to a disturbance in the airflow, thus limiting the benefits of the vortical flow structure. This type of structure is also quite complicated in construction.

PCT application No. WO 2004/097216 (Stiig, Golriz) discloses a wind power plant having a vertical tower having non-circular elliptical cross-section and a single side inlet for generation of a vortical flow structure. The entire tower is rotatable so that the large axis of the ellipse is kept parallel to the wind direction. Rotation of the tower is accomplished by a motor and is quite cumbersome. Expenditure of energy to rotate the tower also decreases the overall efficiency of the plant.

While some wind power technologies have been translated to hydraulic power technologies (and vice versa), the use of a different working fluid can precipitate a number of design changes. For instance, the density of water is obviously much higher than the density of air. Also, maintenance issues arise due to the relative inaccessibility of hydraulic power generators. As such, the above described plants involving a motorized rotation of the generator would be impractical.

SUMMARY OF THE INVENTION

In the present invention, apparatus for generating electric power from water currents is provided, which apparatus generates at least one pair of vortical flow structures for efficient power generation. The apparatus is low maintenance and is self aligning with respect to the direction of current flow. The apparatus is particularly suited to low head and high flow rate sites.

According to a first aspect of an embodiment of the invention, there is provided apparatus for generating electric power from water currents. The apparatus comprises a housing having at least one pair of channels, at least one pair of turbine assemblies and at least one pair of generator assemblies. Each channel of the pair has an axial intake, an axial discharge opening and a side intake. Each side intake extends along a length of the channel and faces in an upstream direction to receive a side inflow of water and direct the side inflow up against an interior surface of the channel to create a vortical flow structure having a low pressure core. The apparatus also comprises a partition extending between the at least one pair of channels near said axial intakes. Each turbine assembly of the at least one pair of turbine assemblies is rotatably mounted in a corresponding one of the channels proximal to the axial intakes so that the vortical flow structures are produced downstream of the turbine assemblies to affect an increase in a pressure drop across each of the turbine assemblies. Each of the turbine assemblies are driven by an axial inflow of water received by a corresponding one of the axial intakes. Each generator assembly of the at least one pair of generator assemblies is connected to a corresponding turbine assembly of the at least one pair of turbine assemblies. The generator assemblies generate electric power as the turbine assemblies rotate. A difference between the low pressure cores of the vortical flow structures and a pressure upstream of the turbine assemblies provides an increase in mechanical fluid energy for driving the turbine assemblies and a corresponding increase in electric power generated by the generator assemblies.

According to a second aspect of an embodiment of the invention, there is provided, in an apparatus for generating electric power from water currents, yaw control means comprising at least one tail fin extending outwardly in a downstream direction from a housing of the apparatus. The at least one tail fin generates a corrective moment. The housing has at least one channel, at least one turbine assembly and at least one generator assembly. The at least one channel has an axial intake and an axial discharge opening. The at least one turbine assembly is rotatably mounted in the channel proximal to the axial intake. The at least one turbine assembly is driven by an axial inflow of water received by the axial intake. The at least one generator is connected to the turbine assembly for generating electric power as the turbine assembly rotates.

BRIEF DESCRIPTION OF THE DRAWINGS

An embodiment of the invention will now be described by way of example with reference to the accompanying drawings, in which.

DETAILED DESCRIPTION OF THE INVENTION

Figure 1:
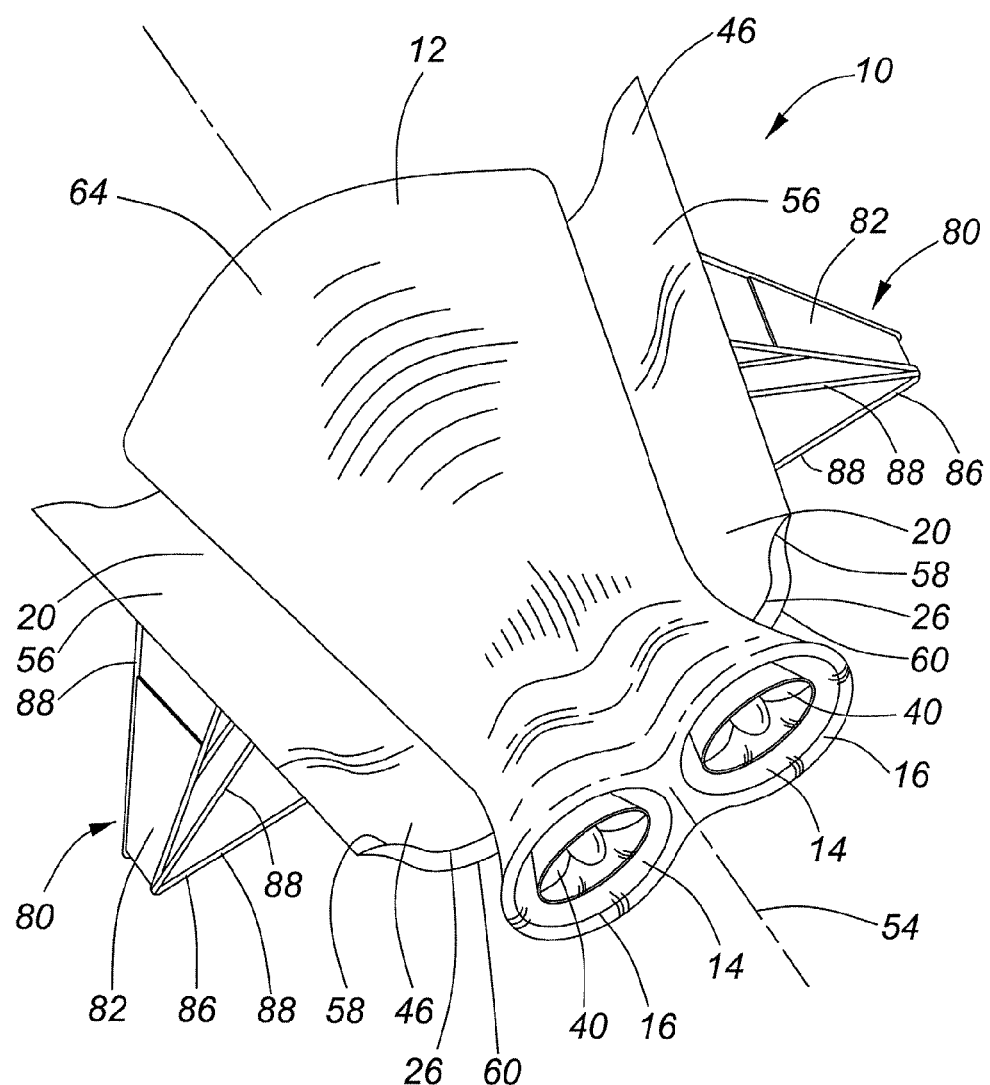
FIG. 1 is a perspective view of an apparatus in accordance with an embodiment of the invention.

Like reference numerals are used throughout the following description to denote similar elements and features.

Turning to the embodiment of the invention illustrated in FIGS. 1 to 5, there is provided apparatus 10 for generating electric power from water currents. Apparatus 10 comprises a housing 12 having a pair of channels 14. Each channel 14 of the pair has an axial intake 16, an axial discharge opening 18 and a side intake 20. Each side intake 20 extends along a length of the channel 14 and faces in an upstream direction 22 to receive a side inflow 24 (shown in FIG. 5) of water and direct the side inflow 24 up against an interior surface 26 of the channel 14 to create a vortical flow structure 28 (shown exiting the channel in FIG. 5) having a low pressure core.

The side intakes 20 may extend along a full length of the channels 14 or along a partial length of the channels 14. The particular width and height of each of the side intakes 20 affect the mass and angular momentum distribution of the vortical flow structures 28.

Figure 2:
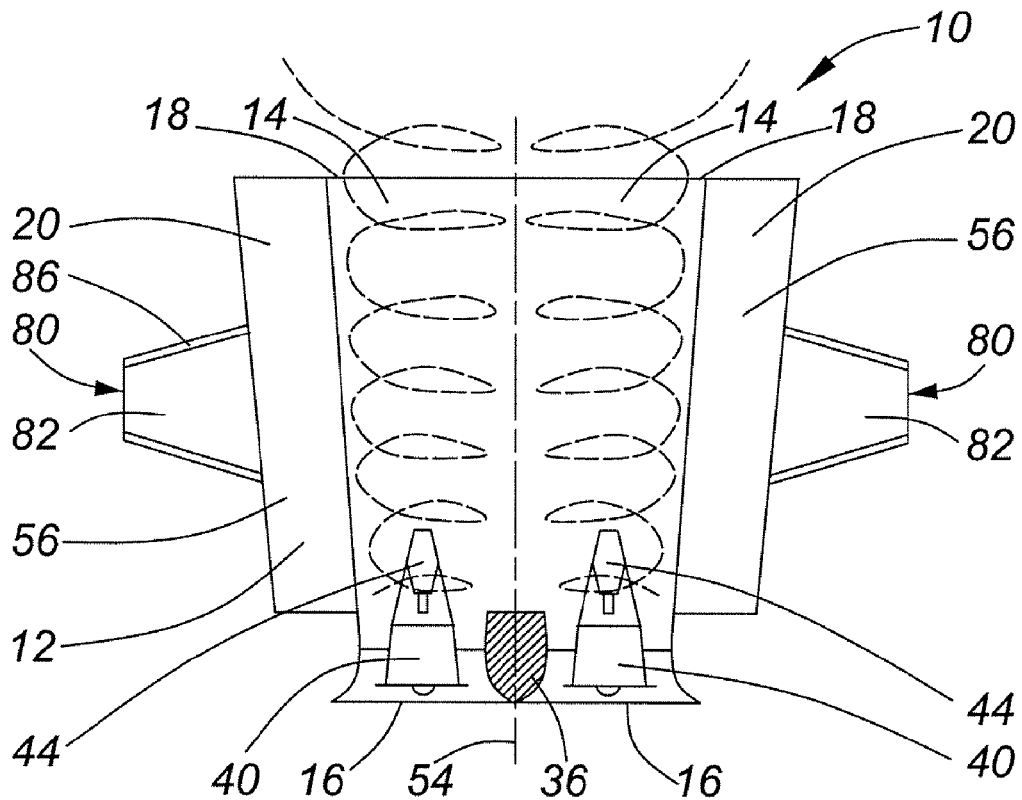
FIG. 2 is a side sectional view of the apparatus of FIG. 1.

As is shown in FIG. 2, the two channels 14 are separated by a partition 36 between the two turbine assemblies 40 near the axial intakes 16. The channels 14 are also to be separated along their remaining length, either partially, as suggested in FIGS. 2 and 4, or fully, which would mean the extension of partition 36 along the full length of channels 14.

Figure 3:
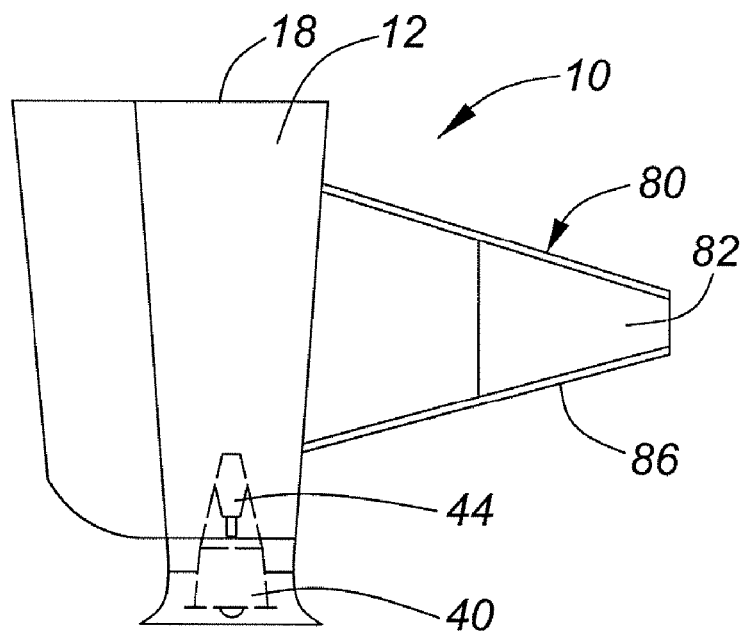
FIG. 3 is a side view of the apparatus of FIG. 1, showing the turbine and generator assemblies in phantom.

Referring to FIGS. 2 and 3, a pair of turbine assemblies 40 are rotatably mounted in corresponding ones of the channels 14 proximal to the axial intakes 16. The vortical flow structures 28 are thus produced downstream of the turbine assemblies 40. Each of the turbine assemblies 40 are driven by an axial inflow of water 42 (shown in FIG. 5) received by a corresponding one of the axial intakes 16. The result of this configuration is an increase in a pressure drop across each of the turbine assemblies 40.

The interior surface 26 of each channel 14 is shaped in a form (such as the form shown in FIG. 4) which efficiently produces the vortical flow structure 28 downstream of the corresponding turbine assembly 40.

A pair of generator assemblies 44 are connected to the turbine assemblies 40. These generator assemblies 44 generate electric power as the turbine assemblies 40 rotate. The difference between the low pressure cores of the vortical flow structures 28 and a pressure upstream of the turbine assemblies 40 causes an increase in the pressure drop driving the turbine assemblies 40, as mentioned previously, and a corresponding increase in electric power generated by the generator assemblies 44. In other words, the amount of mechanical fluid energy available to the turbine assemblies increases.

The turbine assemblies 40 are of axial-flow configuration. Suitable configurations include propeller, Kaplan or Bubble turbines as these configurations are most suitable for efficient shaft power generation in the conditions of the presently described apparatus, namely relatively low head and high flow rates. Of course, this list of configurations is not intended to be exhaustive and any suitable turbine configuration may be used. Further, it should be noted that the present apparatus is also geometrically compatible with radial inflow (Francis) turbine configurations or mixed-inflow configurations. If a radial inflow or mixed-inflow configuration were used, the radial intake of each turbine assembly would be set up so that it faces the prevailing water currents.

The generator assemblies 44 may be attached to one of the downstream ends (as shown in the Figures) or the upstream ends (not shown) of the turbine assemblies 40. Attachment to the downstream ends provides for an unobstructed axial inflow 42. Alternatively, the generator assemblies 44 may be located outside of the housing 12 for easier access for maintenance purposes (not shown).

Each of the axial intakes 16 is shaped in the form of a bellmouth of elliptic contour to allow for uniform axial inflow 42 with minimal total pressure loss. The axial intakes 16 may be sized so that all axial inflow 42 takes place through the turbine assemblies 40. Alternatively, the axial intakes 16 may be larger than the turbine assemblies 40 so that a portion of the axial inflow 42 is directed around the turbine assemblies 40. The optimum configuration is one that yields a flow field within the apparatus 10 such that the pressure differential across the turbine assemblies 40 is maximized.

The flow area of each of the axial intakes 16 may be smaller than the flow area of each of the discharge openings 18 to further increase the pressure differential across the turbine assemblies 40. Alternatively, the flow area of each of the axial intakes 16 may be substantially equal to the flow area of each of the discharge openings 18.

Figure 4:
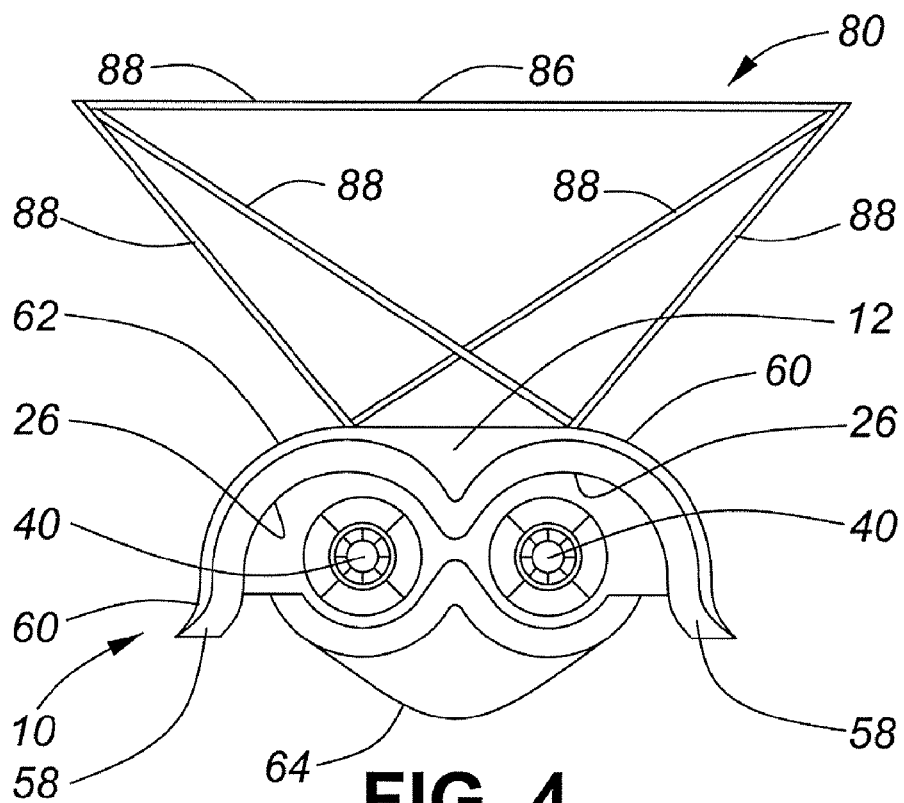
FIG. 4 is a top view of the apparatus of FIG. 1.

The two side intakes 20 may be in opposed orientations (i.e. mirror images of each other) so that the turbine assemblies 40 have opposite rotation directions, as is clearly shown in FIG. 4. This configuration provides a symmetric flow field throughout the apparatus 10 and hence a zero moment about the longitudinal axis 54 of the housing 12 under the conditions of a spatially uniform flow of the prevailing water currents. If the two side intakes 20 are in opposed orientations, the two channels 14 do not need to be fully separated along the length of the side intakes 20 (above the partition 36), which is the configuration shown in FIGS. 2 and 4. This is the preferred configuration, for it allows for hydrodynamic interaction of the vortical structures in each channel of the pair 14, which is beneficial in promoting symmetry of the flow in the channels.

Alternatively, the two side intakes 20 may have the same orientation and the turbine assemblies 40 rotate in the same rotation direction. If the two side intakes 20 have the same orientation, a full circumferential partition (not shown), or at least a mostly full circumferential partition, would be required between the channels 14 along the length of the side intakes 20 to prevent the vortical flow structures 28 from diminishing in strength due to their mutual interaction.

Referring again to FIG. 4, an entrance region of each of the side intakes 20 may comprise a lip 58 of elliptic geometry. The lip 58 minimizes the risk of flow separation during the side inflow thus increasing the flowrate through the side intakes 20 and minimizing pressure loss. The lip 58 also ensures flow separation from an exterior wall 60 of the housing 12 just downstream of the side intakes 20. Additional symmetrical geometric discontinuities (not shown) may be provided on an exterior wall 60 of the housing 12 to effect flow separation (regardless of the Reynolds number). Symmetry of the external geometry of the apparatus 10 ensures symmetry of the time-averaged external flow pattern provided that the location of flow separation on the exterior wall 60 of the housing 12 is the same on each side.

The exterior upstream surface 64 of the housing 12 between the two side intakes 20 may have a shape formed by a combination of two ellipses to direct the external flow, i.e. the side inflow of water 24, towards the side intakes 20 with minimum risk of flow separation from the exterior upstream surface 64.

Figure 5:
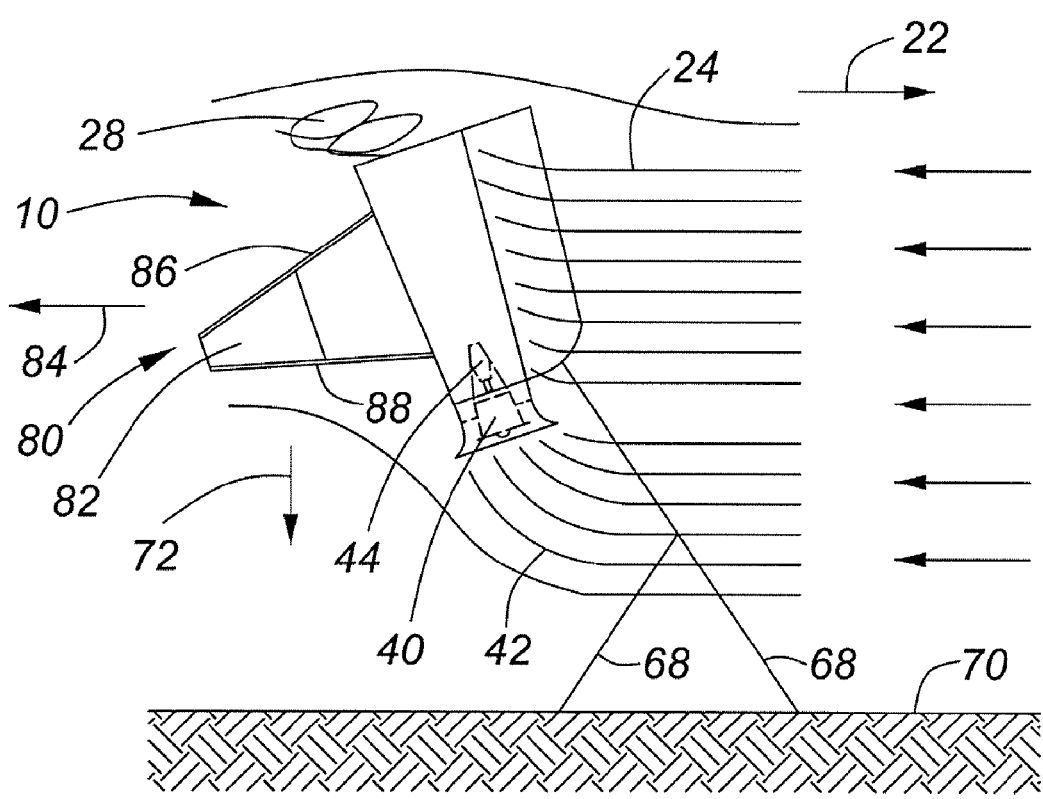
FIG. 5 is a side view of the apparatus of FIG. 1, in use, showing the turbine and generator assemblies in phantom.

Referring to FIG. 5, apparatus 10 may further comprise tethering means 68 for attaching the housing 12 to the waterbed 70. The housing 12 will be inclined with respect to the gravitational direction 72. The inclination yields the added benefit of a RAM effect as the water enters the housing 12 through the axial intakes 16. The inclination also affects the axial flow momentum within the housing 12. The angle of inclination of the housing 12 is dictated by the hydrostatic forces (buoyancy), hydrodynamic forces and the gravitational force acting upon the apparatus 10. The angle of inclination of the housing 12, which can be controlled by controlling the buoyancy of the housing, will affect the performance of the apparatus.

Suitable design and material choices may be made to achieve a desired buoyancy. For example, the housing 12 may be a fully or partially hollow shell. Such a shell may be constructed of a material that is heavier than water. The walls of the shell may be hollow and filled with a material that is lighter than water. The fill material may be solid.

Alternatively, apparatus 10 may comprise a base (not shown) to which the housing 12 would be swingably mounted. The base would rest on the waterbed 70. The housing 12 would be elevated from the waterbed 70 to allow water to flow into the axial intakes 16. The housing 12 will be inclined with respect to the gravitational direction 72. This inclination would be a predetermined value set during installation.

Apparatus 10 may further comprise yaw control means 80 to keep the housing 12 facing in an upstream direction 22 to maximize the side inflow 24 and the axial inflow 42. The yaw control means 80 may comprise a pair of tail fins 82 extending outwardly from the housing 12 in a downstream direction 84. These tail fins 82 keep the side intakes 20 facing in the upstream direction 22 by generating corrective moments. The tail fins 82 are symmetrically arranged at the outer portions of the wake of the housing 12.

Each fin 82 is supported by a frame 86 at some distance downstream of the housing 12. The frame 86 is attached to the exterior wall 60 of the housing 12. The frame 86 is constructed of light-weight tubular members 88 and is triangulated such that a sufficiently stiff connection is realized with minimal structural weight, as shown in the Figures.

The tail fins 82 are also set up so that the tail fin that is to produce the corrective moment does not remain immersed in the wake of the housing 12 to ensure that it efficiently develops the corrective moment when the side intakes 20 are not in their intended orientation with respect to the prevailing water currents. Even with small perturbations in the angular orientation of the apparatus 10 with respect to the prevailing currents, the tail fin 82 that is to produce the corrective moment will emerge from the wake of housing 12.

As will be understood by the skilled person, a larger corrective moment will result from a particular fin 82 if that fin 82 is supported at a larger distance from the housing 12 (i.e. a larger moment arm). The skilled person would understand that for a given corrective moment, an increase in the length of this moment arm allows for a reduction in the required hydrodynamic force on the tail fin 82 (hence a reduction in the size of this fin). Of course, the particular length of the frame members 88 will be limited by the environment in which the apparatus 10 is placed.

Additionally or alternatively, the yaw control means may comprise additional corrective moments created by the shape of the exterior wall 60. Various features of the apparatus 10 such as the side intakes 20, etc. may also contribute to these additional corrective moments. More specifically, the pressure distribution over the exterior wall 60 affects this corrective moment whenever the housing 12 deviates from an orientation wherein the side intakes 20 are facing the upstream direction 22. Such deviations can be caused by variations in the current flow rate and the like.

It should be understood that while in the above description, a single dedicated side intake 20 was provided for each of the channels 14, multiple side intakes 20 could alternatively be provided.

It should also be understood that the apparatus 10 described above is scalable. In addition, various design parameters, such as the width and height of the side intakes 20, may be adjusted to suit a particular application.

It should also be understood that while in the above description, a pair of channels 14 (and turbine assemblies 40, and so on) are provided, any even number of channels 14 (and turbine assemblies 40 and so on) may be provided. An even number is required to maintain the symmetry and corrective moments of the apparatus 10. An odd number (including one) is however conceivable if the necessary modifications could be made to compensate for the asymmetry, for example as outlined above in the discussion of additional corrective moments.

Similarly, the apparatus 10 may comprise a housing 12 having a single channel 14 (not shown). The channel 14 would have an axial intake 16 and an axial discharge opening 18. The apparatus 10 would also have a single turbine assembly 40 rotatably mounted in the channel 14 proximal to the axial intake 16. The turbine assembly 40 would be driven by an axial inflow 42 of water received by the axial intake 16. A generator assembly 44 would be connected to the turbine assembly 40 for generating electric power as the turbine assembly 40 rotates. The apparatus 10 would require suitable yaw control means 80 including a tail fin 82 extending outwardly in a downstream direction from the housing 12. The tail fin 82 would generate a corrective moment to keep housing facing in an upstream direction 22. Of course, the housing 12 could have more than one tail fin 82, symmetrically arranged as described previously. Alternatively or additionally, the yaw control means 80 may comprise a shape of the exterior wall 60 of the housing 12 such that a corrective moment is created by a pressure distribution over the exterior wall 60 whenever the housing 12 deviates from an orientation wherein the side intake 20 is facing the upstream direction 22.

While the invention has been described in detail in the foregoing specification, it will be understood by those skilled in the art that variations may be made without departing from the spirit and scope of the invention, being limited only by the appended claims.

What we claim as our invention is:

1. Apparatus for generating electric power from water currents comprising:
    a housing having at least one pair of channels, each channel of the pair having an axial intake, an axial discharge opening and a side intake, each said side intake extending along a length of said channel and facing in an upstream direction to receive a side inflow of water and direct said side inflow up against an interior surface of said channel to create a vortical flow structure having a low pressure core;
    a partition extending between said at least one pair of channels near said axial intakes;
    at least one pair of turbine assemblies, each turbine assembly of the pair rotatably mounted in a corresponding one of said channels proximal to said axial intakes so that said vortical flow structures are produced downstream of said turbine assemblies to effect an increase in a pressure drop across each of said turbine assemblies, each of said turbine assemblies being driven by an axial inflow of water received by a corresponding one of said axial intakes; and
    at least one pair of generator assemblies, each generator assembly of the pair connected to a corresponding turbine assembly of said at least one pair of turbine assemblies, said generator assemblies generating electric power as said turbine assemblies rotate,
wherein a difference between the low pressure cores of said vortical flow structures and a pressure upstream of said turbine assemblies provides an increase in mechanical fluid energy for driving said turbine assemblies and a corresponding increase in electric power generated by said generator assemblies.

2. Apparatus according to claim 1, wherein said housing 12 is of a shell construction to provide a buoyancy force.

3. Apparatus according to claim 1, wherein, within said at least one pair of channels, said side intakes are in opposed orientations and said turbine assemblies have opposite rotation directions.

4. Apparatus according to claim 1, wherein, within said at least one pair of channels, said side intakes have the same orientation and said turbine assemblies have the same rotation directions.

5. Apparatus according to claim 1, wherein said side intakes extend along a full length of said channels.

6. Apparatus according to claim 1, wherein said side intakes extend along a partial length of said channels.

7. Apparatus according to claim 1, wherein an entrance region of each of said side intakes comprises a lip having a partial elliptical shape to minimize a risk of flow separation during said side inflow, thus increasing a flowrate of said side inflow and minimizing pressure loss.

8. Apparatus according to claim 7, wherein said lip ensures flow separation from an exterior wall of said housing just downstream of said side intakes.

9. Apparatus according to claim 1, wherein an exterior upstream surface of said housing between said two side intakes has a shape formed by a combination of two ellipses to direct said side inflow towards said side intakes with a minimum risk of flow separation from said exterior upstream surface of said housing.

10. Apparatus according to claim 1, wherein an upstream exterior surface of said housing guides an exterior flow of water towards each said side intake.

11. Apparatus according to claim 1, wherein each of said at least one pair of generator assemblies is attached to one of a downstream end and a upstream end of a corresponding one of said at least one pair of turbine assemblies.

12. Apparatus according to claim 1, further comprising tethering means for attaching said housing to a waterbed, said housing being inclined with respect to a gravitational direction.

13. Apparatus according to claim 1, wherein said housing is swingably mounted on a base attached to a waterbed, said housing being inclined with respect to a gravitational direction and elevated from said base to allow water to flow into said axial intakes.

14. Apparatus according to claim 13, wherein said housing is inclined with respect to the gravitational direction by a predetermined value during installation.

15. Apparatus according to claim 1, further comprising yaw control means.

16. Apparatus according to claim 15, wherein said yaw control means comprises at least one tail fin extending outwardly in a downstream direction from said housing to keep said side intakes facing in said upstream direction, said at least one tail fin generating a corrective moment.

17. Apparatus according to claim 15, wherein said yaw control means comprises at least two symmetrically arranged tail fins extending outwardly in a downstream direction from said housing to keep said side intakes facing in said upstream direction, each of said at least two symmetrically arranged tail fins generating a corrective moment.

18. Apparatus according to claim 15, wherein said yaw control means comprises a shape of an exterior wall of said housing, said shape being such that a corrective moment is created by a pressure distribution over said exterior wall whenever said housing deviates from an orientation wherein said side intakes are facing said upstream direction.

19. Apparatus according to claim 15, wherein said yaw control means comprises:
  at least one tail fin extending outwardly in a downstream direction from said housing to keep said side intakes facing in said upstream direction, said at least one tail fin generating a corrective moment; and
  an exterior wall of said housing being shaped such that a corrective moment is created by a pressure distribution over said exterior wall whenever said housing deviates from an orientation where said side intakes are facing said upstream direction.

20. Apparatus according to claim 15, wherein said yaw control means comprises:
  at least two symmetrically arranged tail fins extending outwardly in a downstream direction from said housing to keep said side intakes facing in said upstream direction, each of said at least two symmetrically arranged tail fins generating a corrective moment; and
  an exterior wall of said housing being shaped such that a corrective moment is created by a pressure distribution over said exterior wall whenever said housing deviates from an orientation where said side intakes are facing said upstream direction.

21. In an apparatus for generating electric power from water currents, said apparatus comprising a housing having at least two channels, each channel having an axial intake, an axial discharge opening, at least one turbine assembly rotatably mounted in said channel proximal to said axial intake, said at least one turbine assembly being driven by an axial inflow of water received by said axial intake, and at least one generator assembly connected to said turbine assembly for generating electric power as said turbine assembly rotates, each channel having at least one side intake extending along a length of said channel and facing in an upstream direction to receive a side inflow of water and direct said side inflow up against an interior surface of said channel to create a vortical flow structure having a low pressure core downstream of said turbine assembly to effect an increase in the pressure drop across each of said turbine assemblies, said channels being separated by a partition near said axial intakes, wherein a difference between the low pressure cores of said vortical flow structures and a pressure upstream of said turbine assemblies provides an increase in the mechanical fluid energy for driving said turbine assemblies and a corresponding increase in electric power generated by said generator assemblies:
  yaw control means comprising at least one tail fin extending outwardly in a downstream direction from said housing, said at least one tail fin generating a corrective moment.

22. In the apparatus according to claim 21, wherein said at least one tail fin keeping said side intakes facing in said upstream direction.

23. In the apparatus according to claim 21, said yaw control means comprising at least two of said tail fins, symmetrically arranged.

24. In the apparatus according to claim 23, said at least two tail fins keeping said side intakes facing in said upstream direction.

25. In the apparatus according to claim 21, wherein an exterior wall of said housing is such that a corrective moment is created by a pressure distribution over said exterior wall whenever said housing deviates from an orientation wherein said side intakes are facing said upstream direction.

26. In the apparatus according to claim 21, wherein said at least one tail fin is supported by a frame at a distance from said housing.

27. In the apparatus according to claim 26, wherein said frame is constructed of light-weight tubular members.

28. In the apparatus according to claim 27, wherein tubular members are triangulated to provide a stiff connection between said fin and said housing.

* * * * *